US006985801B1

(12) United States Patent
Straub et al.

(10) Patent No.: US 6,985,801 B1
(45) Date of Patent: *Jan. 10, 2006

(54) COCKPIT INSTRUMENT PANEL SYSTEMS AND METHODS WITH REDUNDANT FLIGHT DATA DISPLAY

(75) Inventors: Philip I. Straub, Olathe, KS (US); Dale R. Langner, Olathe, KS (US)

(73) Assignee: Garmin International, Inc., Olathe, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 10/987,274

(22) Filed: Nov. 12, 2004

Related U.S. Application Data

(63) Continuation of application No. 10/785,545, filed on Feb. 24, 2004, now Pat. No. 6,842,672, which is a continuation of application No. 10/086,783, filed on Feb. 28, 2002, now Pat. No. 6,832,138.

(51) Int. Cl.
G05D 1/00 (2006.01)

(52) U.S. Cl. .................. 701/3; 701/4; 701/14; 244/1 R; 244/75 R; 340/945; 340/971

(58) Field of Classification Search .................... 701/3, 701/4, 14; 244/1 R, 75 R; 340/945, 971
See application file for complete search history.

(56) References Cited

U.S. PATENT DOCUMENTS

| | | | |
|---|---|---|---|
| 4,845,495 A | 7/1989 | Bollard et al. | 340/973 |
| 4,988,995 A | 1/1991 | Buisson et al. | 340/971 |
| 5,019,980 A | 5/1991 | Starr et al. | 701/35 |
| 5,195,040 A | 3/1993 | Goldsmith | 701/200 |
| 5,416,705 A | 5/1995 | Barnett | 701/14 |
| 5,916,297 A | 6/1999 | Griffin et al. | 701/120 |
| 5,917,562 A | 6/1999 | Woodgate et al. | 349/15 |
| 5,978,715 A | 11/1999 | Biffe et al. | 701/11 |
| 6,112,140 A | 8/2000 | Hayes et al. | 701/14 |

(Continued)

FOREIGN PATENT DOCUMENTS

WO    WO 9743704 A1    11/1997

OTHER PUBLICATIONS

Al Ditter, "An Epic in the Making", *Commuter World*, Dec. 1996-Jan. 1997, pp. 16, 18-21.

(Continued)

*Primary Examiner*—Michael J. Zanelli
*Assistant Examiner*—Eric M. Gibson
(74) *Attorney, Agent, or Firm*—Devon A. Rolf

(57) ABSTRACT

Systems and methods are provided for integrated control, access, and presentation of flight information within the cockpit. Cockpit instrument systems and methods are provided which include a first cockpit instrument panel which has a first display proximately located to a first bezel. The first display is operable to present navigational data, communication data, and flight information data including airspeed, attitude, and altitude. The systems and methods further include a second cockpit instrument panel located adjacent to the first cockpit instrument panel. The second cockpit instrument panel has a second display proximately located to a second bezel. The second display is operable to present navigational data, communication data, and flight information data including detailed engine parameters. When either the first or the second cockpit instrument panel fails, the remaining functional, first or second display, is adapted to provide all of the important flight information data, including airspeed, attitude, altitude, and detailed engine parameters.

23 Claims, 7 Drawing Sheets

U.S. PATENT DOCUMENTS 6,112,141 A     8/2000  Biffe et al.  ................... 701/14
6,314,343 B1   11/2001  Adams et al. ................. 701/3

OTHER PUBLICATIONS

William B. Scott, "Pentium Powers 'Epic' Integrated Avionics", *Aviation Week & Space Technology*, Nov. 18, 1996, pp. 67-69.

James Holahan, "LCDs, Mice on the Flight Deck!", *Aviation International News*, Nov. 1, 1996, pp. 56-58.

Fred George, "Introducing Primus Epic", *Business & Commercial Aviation*, Nov., 1996, pp. 116, 118-120.

"Pilot's Guide", *RMS 555 Bendix/King Radio Management System*, Product Manual, Allied Signal General Aviation Avionics, Olathe, Kansas, Mar. 1, 1993.

COCKPIT INSTRUMENT PANEL SYSTEMS AND METHODS WITH REDUNDANT FLIGHT DATA DISPLAY

CROSS-REFERENCE TO RELATED APPLICATIONS

The present application is a continuation application and claims priority benefit of U.S. patent application Ser. No. 10/785,545, filed Feb. 24, 2004 now U.S. Pat. No. 6,842,672, which application is a continuation of and claims priority benefit of U.S. application Ser. No. 10/086,783, filed Feb. 28, 2002 now U.S. Pat. No. 6,832,138, both entitled COCKPIT INSTRUMENT PANEL SYSTEMS AND METHODS WITH REDUNDANT FLIGHT DATA DISPLAY, and which are incorporated by reference.

This application is also related to the following co-pending, commonly assigned U.S. patent applications: "Cockpit Instrument Systems and Methods of Presenting Cockpit Instrument Data," Ser. No. 10/086,951; "Cockpit Control Systems and Methods of Controlling Data on Multiple Cockpit Instrument Panels," Ser. No. 10/086,929; "Cockpit Display Systems and Methods of Presenting Data on Cockpit Displays," Ser. No. 10/086,598; "Cockpit Control Systems and Methods with Variable Flight Display," Ser. No. 10/086,573; and "Cockpit Control Systems and Methods with Softkey Input Functionality," Ser. No. 10/086,996 each of which is by the same inventors and of which the disclosure is herein incorporated by reference in its entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the screen layouts, and data as described below and in the drawings hereto: Copyright © 2001, Garmin Corporation, All Rights Reserved. as described below and in the drawings hereto: Copyright © 2001, Garmin Corporation, All Rights Reserved.

FIELD OF THE INVENTION

The present invention relates generally to cockpit instrument panel systems and methods of presenting cockpit instrument data. In particular, the present invention is directed to cockpit instrument panel systems and methods with redundant flight data display.

BACKGROUND OF THE INVENTION

Modern commercial/private aircraft, as well as older aircraft, include a myriad of instrumentation panels having controls and displays used to present information related to the controls. The controls and the displays are operated, viewed, and interpreted by a pilot during flight of an aircraft. Examples of the controls and displays employed by a pilot in piloting the aircraft include an altimeter, an airspeed indicator, a horizontal situation indicator, an attitude indicator, and the like. Other controls are used to permit radio communication with other pilots in the air or with air traffic controllers during flight. Still more controls are used to assist in navigation. In recent years these controls include controls for Global Positioning Systems (GPS) associated with satellite technology. Furthermore, transponder controls permit the aircraft to be uniquely identified and the aircraft's altitude communicated to air traffic controllers during flight.

For a neophyte, the quantity of controls, inputs, and display panels contained within the cockpit of an aircraft are daunting. Even experienced pilots/users must stay focused to interpret information presented on various displays throughout the cockpit and often must switch between the use of alternate hands during flight to access various controls and control inputs within the cockpit. As a result, pilots/users must continually scan a plurality of available displays for vital information at any particular moment in time during flight.

The Federal Aviation Administration has promulgated regulations requiring that some controls have backup controls and have backup presentation on multiple displays within the cockpit in the event a primary control or display, presenting any setting data associated with the controls, should fail during flight. Backup is especially important for communication controls, navigational controls, and equipment controls or instruments, as well as the instrument displays which present data associated with these controls and instruments, since these controls and instrument displays vitally assist a pilot during flight. This data associated with these controls and instruments includes the flight information data a pilot needs for flight. Flight information data must have redundancy in the cockpit. By way of example, but not by way of limitation, the flight information data generally needed by the pilot includes attitude, airspeed, and altitude. As used herein, the term attitude is used to describe the orientation of an aircraft above the earth. That is, the attitude describes whether the aircraft is pitched or banked whereas altitude provides the height or distance of the aircraft above the earth.

Conventionally, the redundancy for flight information data is provided by different systems. For example, general aviation aircraft typically can include a vacuum system and an electrical system. Airspeed is typically measured using a pitot tube and displayed to the pilot on a readout dial. If the pitot tube becomes clogged with ice it can no longer provide data on the aircrafts airspeed. However, conventionally there is still enough information provided by other instruments which run off of the electrical system or a function of the vacuum system to determine the airspeed in another manner. Vice versa, if the electrical system failed, then the vacuum system can provide enough information to determine the airspeed of the aircraft in an alternate fashion. Thus, single point failures are avoided.

As another example, if the aircraft's attitude indicator failed, the pilot would lose pitch and roll data. However, the pilot would still be able to indirectly derive roll information from the aircraft's turn coordinator. Thus, in this instance too, the aircraft has a sort of built-in, back-up instrumentation. Described another way, if everything is functioning properly, the pilot can get certain information from certain instruments. And, when certain instruments fail, the pilot can get an indication of flight information data, such as attitude, from instrumentation associated with a different system.

In recent years, multifunction displays (MFDs) have been developed for use within the cockpit of an aircraft. Such MFDs generally contain a single display screen which provides flight data and other information associated with select aircraft instrument or input controls. Often, however, the select aircraft input controls are not integrated into a bezel surrounding the MFD, and sometimes such input controls are not even located in near proximity to the MFD. And, some MFDs only provide data associated with those select aircraft input controls. Correspondingly, the pilot/user still must manage a myriad of displays, controls, and control inputs located at various locations throughout the cockpit. Additionally, data presented within any one display is not necessarily well organized and structured to provide a meaningful integrated presentation to the pilot/user. In other words, within a single MFD related flight information data may not be logically grouped within like regions on the display, such that a single glance at the display would provide the pilot/user with all the desired data at any desired moment.

Further to the discussion above, with the migration toward MFDs which attempt to display flight information data, the MFD has become a source of single point failure. That is, if all of the flight information data is provide to a single LCD or other display, that very display becomes the single point failure when the display goes down.

Some have attempted to overcome this problem by providing a smaller, separate display. However, the confines of the smaller display present the flight information in a different size, format, perspective, and location which requires a mental adjustment by the pilot to acclimate to the new display configuration. Thus, this approach meets the requirements promulgated by the FAA, but does not afford the pilot a quick reference, user intuitive backup for the flight information data when the MFD fails.

Existing cockpit control systems and cockpit instrument displays do not provide seamless integration with respect to communication controls, navigational controls, and equipment controls or instruments, or for the instrument displays which present data associated with these controls and instruments. As a result, the pilot is forced to visually or manually switch to alternate instrument displays and controls in the event of a control or an instrument display failure. Further, the pilot is often forced to view scattered, multiple instrument displays to obtain all the relevant flight information data associated with the controls or instruments. And, the scattered, multiple instrument displays each present data in varying size, formats, and perspectives which require some degree of mental acclimation or adjustment to interpret.

Therefore, there exists a need for a better integrated and backup cockpit control systems and instrument display within the cockpit, which permits the pilot to more rapidly acquire and process flight information data from central locations. Moreover, there exists a need for better backup and redundancy in the presentation of the flight information data when a given instrument providing this data fails.

SUMMARY OF THE INVENTION

The above mentioned problems related to backup and redundancy for flight information data, as well as other problems, are addressed by the present invention and will be understood by reading and studying the following specification. Systems and methods are provided for cockpit instrument panels and cockpit data presentation which provide better backup and are more efficient in the presentation of flight information data. The systems and methods of the present invention offer improved cockpit instrument panels which provide more integrated, user-intuitive, and efficient access to redundant flight information data.

In one embodiment of the present invention, a cockpit instrument system is provided. The system includes a first cockpit instrument panel which has a first display proximately located to a first bezel. The first bezel includes navigational controls and communication controls. The first display is operable to present navigational data, communication data, and flight information data including airspeed, attitude, and altitude. A second cockpit instrument panel is located adjacent to the first cockpit instrument panel. The second cockpit instrument panel includes a second display which is proximately located to a second bezel. The second bezel includes navigational controls and communication controls. The second display is operable to present navigational data, communication data, and flight information data including detailed engine parameters. If the first or the second cockpit instrument panel were to fail, the remaining functional, first or second display, is adapted to provide thereon important flight information data content, including airspeed, attitude, altitude, navigation, and engine parameters from the failed display.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1:
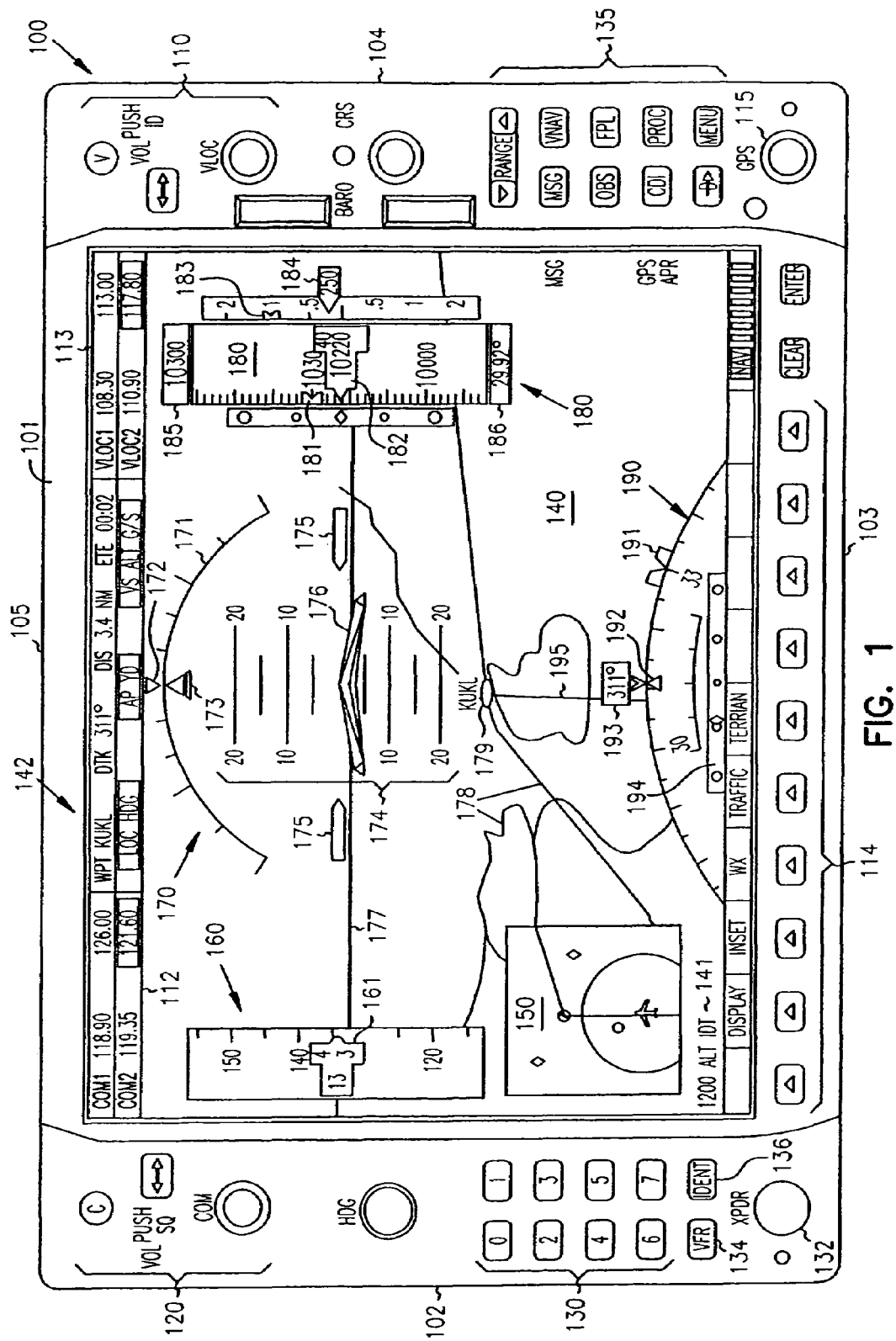
FIG. 1 is cockpit instrument panel, such as a primary flight display (PFD), according to the teachings of the present invention.

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

In the present invention, improved multifunction displays (MFDs) are provided. As used herein, a MFD is used broadly to include graphical user interface based (GUI-based) displays with integrated presentation data presented thereon using a variety of views. The views are configured on the MFDs to provide ready access to flight information data. In some embodiments of the present invention the use of the term MFD is employed in connection with or to refer to a primary flight display (PFD). In some embodiments of the present invention the use of the term MFD is employed in connection with or to refer to a navigation display (NAV display). Additionally, in some embodiments, multiple MFDs are included such that a first MFD is principally used as a PFD and a second MFD is principally used as a NAV display. In such embodiments, the second MFD or NAV display is in compliment to the PFD. In the present invention, multiple MFDs can be stacked one upon the other, or alternatively arranged side by side. Further, in some embodiments an MFD is adapted to include audio capabilities. As one of ordinary skill in the art will appreciate upon reading this disclosure, the flight information data which is presented on such MFDs can differ based on the aircraft type, e.g. frame and engine type.

In the invention, a "bezel" is provided as part of the MFDs. Typically, the bezel is the framed perimeter that surrounds a display, but is not part of the display itself. Further as used in this application, control data and instrumentation data, including flight information data, refer to data received by controls coupled to input devices, such as communication and navigational input devices, and data received from various equipment and sensors, such as the aircraft engine, fuel, airspeed, altitude and attitude sensors. For example, navigational and communication controls tune navigational devices (e.g., VLOC receivers, radios, and the like) within the aircraft and permit software operating on a processing device to receive and process the communication and navigational data collected by such devices. Equipment and sensor instrumentation facilitate the presentation of data relating to such parameters as aircraft engine, fuel, airspeed, altitude and attitude status.

In the present invention, this data can be operated on by software to generate one or more dynamic images on the GUI of a MFD display. As one of ordinary skill in the art will understand upon reading this disclosure, the display is capable of presenting text or graphical information. In some embodiments, the display of provides image or video data. In one example, the GUI depicts a present movement, path and/or projected destination of an aircraft relative to locations on the ground along with airspeed, altitude, attitude and engine status data. As one skilled in the art will appreciate, input devices such as communication and navigation controls include settings such as a current radio frequency, channel, and the like.

Although specific cockpit controls and particular flight information data are described herein, these descriptions are presented by way of example only and are not intended to limit the scope of the present invention. As one of ordinary skill in the art will understand upon reading this disclosure, any existing or customized controls and flight information data are readily integrated with one or more multifunction displays (MFDs) according to the teachings of the present invention. And, any combination and arrangement of the MFDs and the flight information data presented thereon are intended to fall within the scope of the present invention.

According to the teachings of the present invention, flight information data is available at all times. As one of ordinary skill in the art will understand upon reading this disclosure, the MFDs are positioned within the cockpit so that a pilot can view and access communication and navigation controls proximately located to the MFDs at all times during flight.

FIG. 1 illustrates one embodiment of an improved multifunction display (MFD) 100 according to the teachings of the present invention. The MFD 100, as shown in FIG. 1, can be incorporated in a cockpit instrument panel. The MFD 100 includes a bezel 101. In the embodiment shown in FIG. 1, the bezel 101 provides a framed perimeter that surrounds a GUI display 140. Thus, the bezel 101 has four sides namely, a left side 102, a bottom side 103, a right side 104, and a top side 105. As shown in the embodiment of FIG. 1, the bezel 101 includes a number of aircraft instrument and/or input controls. As one of ordinary skill in the art will understand upon reading this disclosure, flight information data and other information associated with these aircraft instrument and/or input controls are provided on display 140. Thus, in the invention, the aircraft instrument and/or input controls are proximately located to where information related to same are displayed. In the embodiment of FIG. 1, the MFD 100 is employed as a PFD 100. As shown in FIG. 1, the bezel 101 has affixed thereon navigational input controls 110 permitting control over the VOR/Localize receiver. As used herein VOR refers to VHF Omnidirectional radio range. In the embodiment of FIG. 1, navigation input control 110 is labeled VLOC as the acronym for the VOR/Localize receiver. In FIG. 1, the bezel has affixed thereon communication input controls, shown as COM 120, permitting radio communications with air traffic controllers and/or other pilots in the air. Further in the embodiment of FIG. 1, the bezel 101 has affixed thereon additional input controls including; transponder input controls such as numeric touch pad 130, XPDR mode control 132, IDENT control 136, and VFR squawk code entry 134.

As will be understood by one of ordinary skill in the art upon reading this disclosure, the additional controls, 130, 132, 134, and 136, are one embodiment of the additional controls which can be included on bezel 101. However, the invention is not so limited. By way of example, and not by way of limitation, additional input controls such as GPS controls 115 and autopilot controls 135 are included in the scope of the present invention. All of the above described controls are adapted to or operable to manipulate the presentation of flight information data on display 140. For example, the pilot can use the numeric touch pad 130 to enter a unique squawk code required by the air traffic controllers to identify the pilot's aircraft. In FIG. 1, the text string "1200 ALT IDT" 141 presented on the display 140 includes the aircraft's transponder identity information. The IDENT 136 control permits the aircraft to uniquely be identified on an air traffic controller's display when requested. For example, if requested the pilot presses the IDENT 136 control and the pilot's aircraft will be uniquely identified on the air traffic controller's display. Further, the XPDR 132 control can change modes or a push action can switch between XPDR 1 and XPDR 2 in order to activate and/or deactivate particular transponder communications.

Further, in some embodiments text messaging controls or video telecommunication controls are affixed on the bezel 101. In one such embodiment, the numeric touch pad 130 includes alpha characters and/or symbol characters on each touch pad along with the numeric depicted in FIG. 1. As one skilled in the art will appreciate, this permits a pilot to send and receive text messages from other pilots, the Internet, authorities, air traffic controllers, or other electronically interfaced sources. Further video controls, in some embodiments, permit the pilot to view the cabin of the aircraft for disturbances or for the air traffic controllers to view different locations within the cockpit and/or cabin of the aircraft.

According to the teachings of the present invention, additional controls affixed to the bezel 101, permit increased integration within the cockpit and provide customized presentations of flight information data on display 140 of MFD 100. For example, overlay controls 114 located on the bottom side 103 of the bezel 101, permit the pilot to adjust the main display 140 by overlaying graphical data related to weather, traffic, and terrain. As used in this application, the overlay controls are sometimes referred to as "softkeys" 114. In FIG. 1, text is provided on the display 140 above the softkeys 114 to identify their respective functionality. This is demonstrated in the embodiment of FIG. 1 with text labels such as TRAFFIC, TERRAIN, and WX (for weather), for example. Further in some embodiments, the display 140 can be customized, such as by using or actuating one or more of the softkeys 114 to create one or more graphical display insets, e.g. inset display 150, within the display 140. In the embodiment of FIG. 1, a softkey 114 for actuating such functionality has a text label INSET provided above that softkey on the display 140.

In the embodiment of FIG. 1, flight information data and/or control setting is displayed horizontally as a data strip 142 across a top portion of the display 140. For example, within data strip 142, communication control settings are shown in a first region 112 (COM1, COM 2) and navigation control settings are shown in a second region 113 (VLOC 1, VLOC 2). Further, within data strip 142, additional flight information data such as a flight plan waypoint (WPT KUKL), desired track (DTK), distance (DIS) to a flight plan waypoint, estimated time enroute (ETE), and a number of other annuciators (LOC HDG, AP YD, and VS ALT G/S) are provided.

Communication input controls, shown as COM 120 in FIG. 1, manipulate the communication settings to change the frequency or channel data, and the like. Navigation input controls, shown as VLOC 110 in FIG. 1, manipulate the navigation settings to change the frequency or channel data, and the like. Transponder (XPDR) mode control, shown as XPDR 132 in FIG. 1, can change modes or a push action can switch between XPDR 1 and XPDR 2 in order to activate and/or deactivate particular transponder communications. Thus, as stated above, the aircraft instrument and/or input controls are proximately located to where information related to same are displayed.

According to the teachings of the present invention, the display 140 of the PFD 100 can further include one or more inset displays, such as display inset 150, as well as a number of graphical information overlays, 160, 170, 180 and 190. The display inset 150 and graphical information overlays, 160, 170, 180 and 190, provide additional flight information data on display 140. As shown in the embodiment of FIG. 1, graphical information overlays, 160, 170, 180 and 190, include indicators for airspeed 160, attitude 170, altitude 180, and heading 190. In the embodiment shown in FIG. 1, inset 150 illustrates a top down navigational view.

In the embodiment shown in FIG. 1, an inset 161 within airspeed indicator 160 provides an aircraft's indicated airspeed at a particular moment in time. In FIG. 1, inset (or screen graphic/overlay) 170 presents the aircraft's attitude data. Attitude indicator 170 includes a pitch and roll scale 171 for the aircraft. In FIG. 1, the pitch and roll scale 171 includes an arc 171 having a bank and a skid indicator, shown as two reference arrows, 172 and 173. In the embodiment of FIG. 1, the top arrow 172 indicates the current degree of bank or roll of the aircraft as measured by the arrows location relative to the arc 171. The bottom arrow 173 is a slip skid indicator 173 which illustrates whether the aircraft is additionally slipping or skidding within a degree of roll, e.g. such as may occur in a banking turn of the aircraft. Thus, in the embodiment of FIG. 1, the attitude indicator 170 represents that the aircraft is flying level, e.g. no roll indicated by arrow 172's position on the arc 171, and accordingly is not experiencing any slip or skid as indicated by arrow 173's position on the arc 171.

Attitude indicator 170 further illustrates a pitch indicator shown as a scale 174. The scale 174 indicates the angle, or pitch, of the plane whether it is angled upward in a climb, downward in a dive, or level with the ground. In the embodiment shown in FIG. 1, the pitch scale 174 indicates that the aircraft is currently flying level with the ground.

Attitude indicator 170, in the embodiment of FIG. 1, also illustrate a number of markers, 175 and 176. In the embodiment of FIG. 1, markers 175 represent the aircraft's wingtips and marker 176 represents the aircraft's nose. Thus, in one embodiment the aircraft's wingtip markers 175 and nose marker 176 are useful in interpreting the aircraft's pitch and roll data in conjunction with and relative to the pitch scale 174, roll arc 171, and bank and slip/skid arrows, 172 and 173 respectively.

In one embodiment according to the teachings of the present invention and as shown in the embodiment of FIG. 1, attitude indicator 170 is provided in a primary display region on display 140. As used herein, primary display region is intended to mean the central portion of display 140. As shown in FIG. 1, attitude indicator 170 occupies the largest portion of display 140. In embodiment of FIG. 1, attitude indicator 170 is presented together with navigation related, flight information data, also displayed in the primary display region of display 140. As shown in the embodiment of FIG. 1, the navigation related, flight information data illustrates a number of geographical features such as a horizon line 177, reservoirs and roadways 178, and a flight plan waypoint (KUKL) 179.

According to the teachings of the present invention, the embodiment shown in FIG. 1 provides navigation related, flight information data which is displayed in the primary display region of display 140 according to a cockpit view, or perspective, display convention. And additionally, a top down navigational inset 150, including navigational features such as cities and other geographical features, is provided within the display 140. As one of ordinary skill in the art will understand upon reading this disclosure, the navigation related, flight information data which is displayed in the primary display region of display 140 according to a cockpit view, or perspective, display convention and the top down navigational inset 150 compliment one another and afford an enhanced overall presentation of navigation related, flight information data.

As one of ordinary skill in the art will appreciate according to the teachings of the present invention, the embodiment of the display of the navigation related, flight information data shown in the primary display region of display 140 is further dynamically configurable to provide a display of navigation related, flight information data which is different from the cockpit view display illustrated in FIG. 1. That is, in one embodiment the display formats for navigation related, flight information data shown in the primary display region of display 140 and that shown in inset 150 can be switched by using or actuating the overlay controls, or softkeys 114. Thus, the cockpit view display would then appear in inset 150 and the top down navigational view would be provided to the primary display region of display 140. According to the teachings of the present invention and as will be appreciated from reading below, other navigation display formats are considered within the scope of the present invention. And, the several navigation display formats can be alternated between an inset 150 and a primary display region of the display 140. The invention is not so limited.

In FIG. 1, altitude indicator 180 shows a scale which provides the aircraft's altitude data on the display 140 of PFD 100. The embodiment shown in FIG. 1 illustrates such explicit data as the aircraft's vertical assent and vertical velocity. In the embodiment of FIG. 1, altitude indicator 180 includes an adjustable display marker 181 which represents a desired altitude for the aircraft. In FIG. 1, this marker 181 is shown set at 10,300 feet. The horizontally oriented rectangular box at the top of the scale is another data indication 185 in this embodiment of the selected, desired altitude, e.g. 10, 300 feet. Marker 182, in FIG. 1, provides data on the aircraft's actual current altitude, e.g. 10,220 feet. The horizontally oriented rectangular box at the bottom of the scale is a data representation in this embodiment of the aircraft's altimeter setting.

The vertically oriented rectangular box on the right margin of the scale provides data on both a desired rate of ascent, or decent, and data on the actual rate of ascent or descent. Thus, in the embodiment shown in FIG. 1, a marker 183 is shown set a 1 (values measured in thousands) indicating a desired rate of climb to be 1,000 feet per minute. And, marker 184 is shown providing data for the aircraft's actual current rate of ascent to be 250 feet per minute.

Heading indicator 190, in FIG. 1, illustrates an arc heading indication 190. As one of ordinary skill in the art will understand upon reading comprehending this disclosure, the arc is a partial compass rose which presents data for the aircraft's course and heading. Heading indicator 190, in the embodiment of FIG. 1, includes an adjustable marker data display 191 which represents a desired compass heading for the aircraft. In FIG. 1, this marker 191 is shown set at 33 (values measured in tens), or 330 degrees clockwise from due North. Marker 192, in FIG. 1, provides data on the aircraft's actual track, e.g. 311 degrees clockwise from due North. In the embodiment of FIG. 1, this track heading data is further displayed in a box 193 above the partial compass rose 190 and in the form of a horizontally oriented, course deviation indicator (CDI) 194.

FIG. 1 illustrates a course line 195 displayed above the partial compass rose 190 and leading to a flight plan waypoint, e.g. airport (KUKL) 179. However, track marker 192 is illustrated offset from the course line 195. As one of ordinary skill in the art will appreciate, the aircraft can be correctly moving along the course line to the desired destination while steering the nose of the aircraft in a direction slightly off from the course line 195. For example, in a strong wind the aircraft will have to direct its nose into the wind somewhat in order to actually track the courseline 195. Alternatively, in velocity vector based systems, the embodiment illustrated in FIG. 1 would actually have the track marker positioned on the courseline 195. As one of ordinary skill in the art will appreciate upon reading this disclosure, the scope of the present invention is intended to include a velocity based system and in such systems the embodiment shown in FIG. 1 will adjust accordingly to illustrate track marker positioned on courseline 195.

FIG. 1, is provided by way of example only, and one of ordinary skill in the art will understand, by reading and comprehending this disclosure, the manner in which the various arrows, markers and/or other indicators, e.g. the flight data indicators for airspeed, attitude, altitude, course heading and the like, will dynamically change relative to the aircraft's status and/or position. The present invention provides an improved PFD 100 which integrates all of the flight information therein.

Figure 2A:
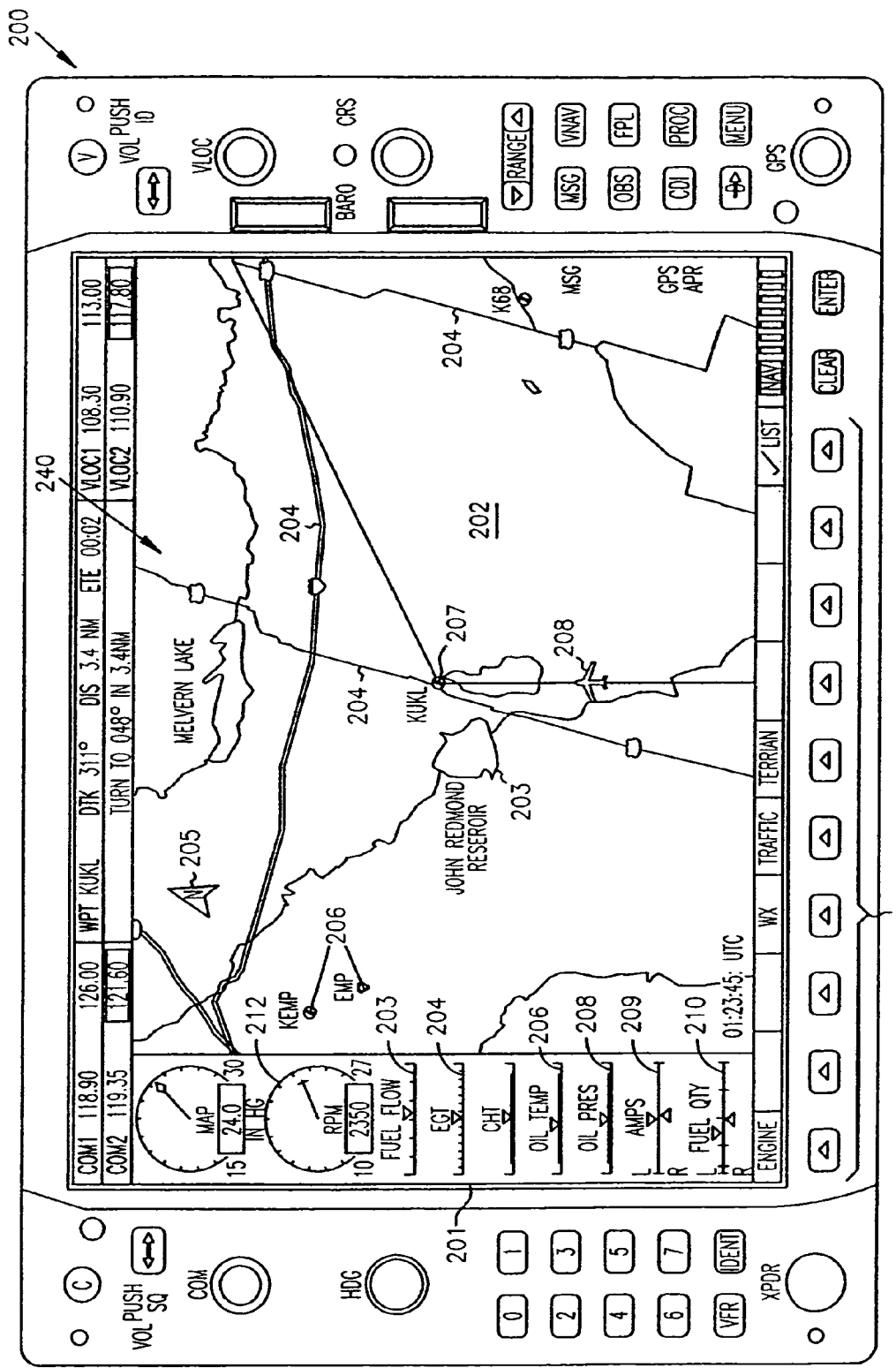
FIGS. 2A–2C are illustrations for a cockpit instrument panel, such as a second multi-functional display (MFD), according to the teachings of the present invention.
Figure 2B:
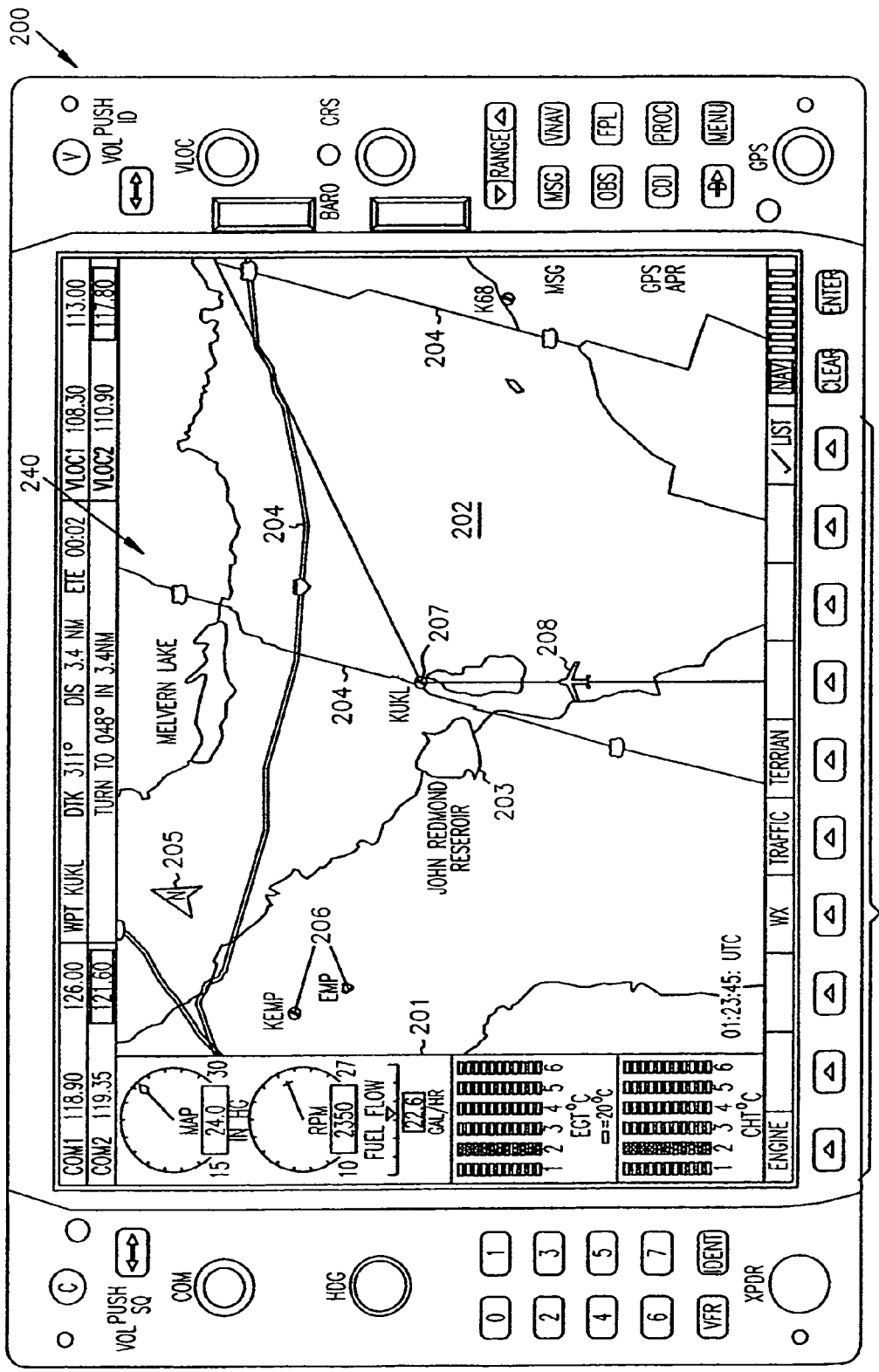
Figure 2C:
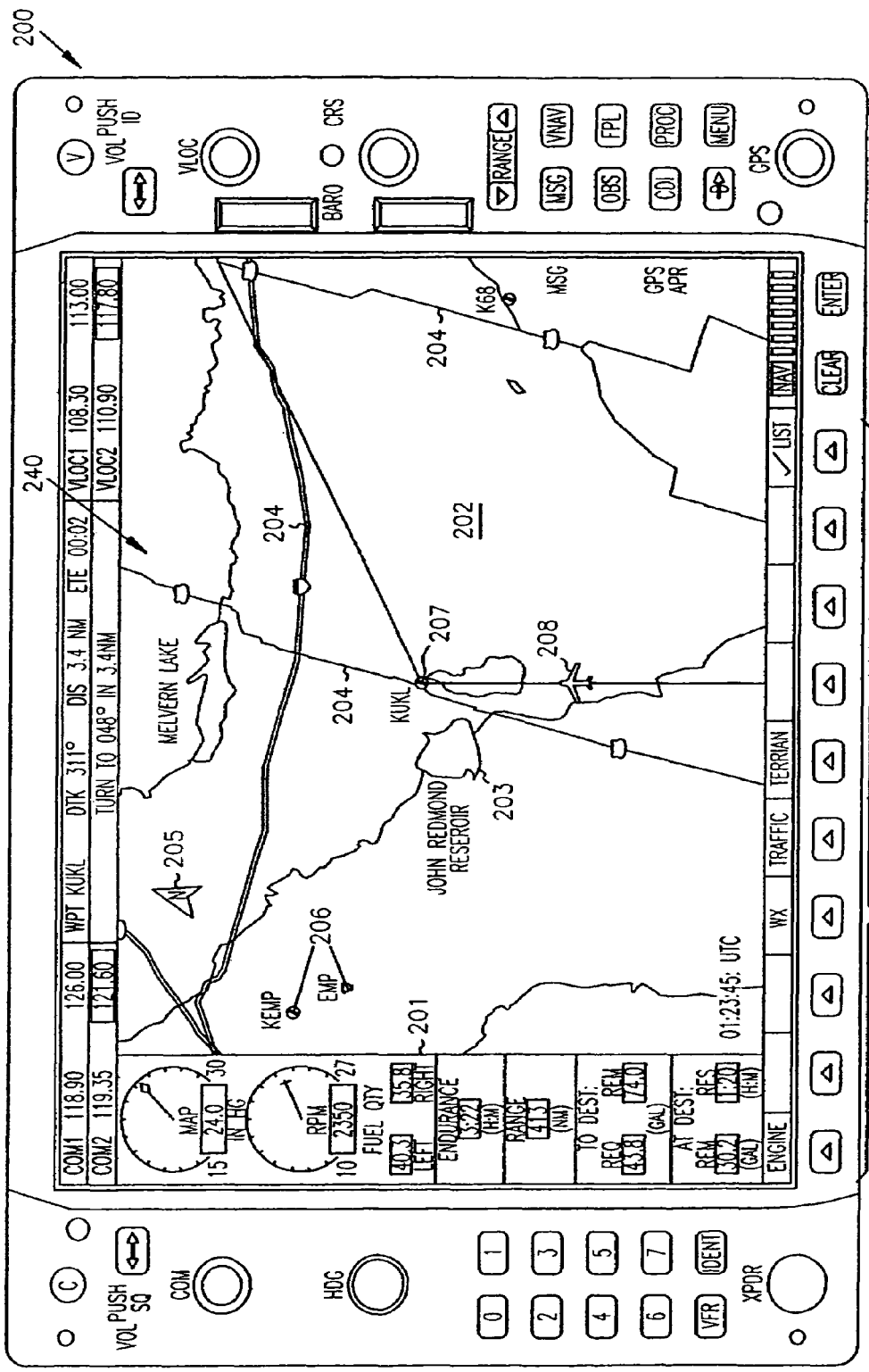

FIGS. 2A–2C provide illustrations for a cockpit instrument panel, such as a second multi-functional display, according to the teachings of the present invention. In FIG. 2A illustrates one variably configurable complimentary multifunction display (MFD) 200, which can be employed in conjunction with the PFD 100 described in detail above in connection with FIG. 1, according to the teachings of the present invention. As shown in FIG. 2A, the MFD 200 is a cockpit instrument panel 200. The MFD 200 shown in FIG. 2A includes all of the novel integration of bezel located controls, panel display, and proximate control devices which are provided in the PFD 100 of FIG. 1. According to the teachings of the present invention, the MFD 200 of FIG. 2A illustrates a complementary display 240. Like the PFD or MFD 100 shown in FIG. 1, the MFD 200 of FIG. 2A is a GUI enabled device capable of presenting text and graphical data/information, image, or video data. In some embodiments MFD 200 is adapted to include control of audio capabilities. In some embodiments MFD 200 is oriented side by side with the PFD 100 of FIG. 1 with a vertically oriented audio system situated between the two MFDs, 100 and 200 (shown in FIG. 4). Such a system configuration is illustrated and described in greater detail in copending application, by the same applicants, entitled "Cockpit Instrument Panel Systems and Methods of Presenting Cockpit Instrument Data," Ser. No. 10/086,951, and filed on even date herewith.

The complementary MFD 200, shown in the embodiment of FIG. 2A, illustrates the MFD 200 being utilized as navigational MFD. Thus, in one embodiment, as used herein, the MFD 200 of FIG. 2A is sometimes referred to as a NAV display 200. However, as will be understood by reading and comprehending this disclosure, the invention is not so limited. In the embodiment shown in FIG. 2A, the display 240 of MFD 200 illustrates engine data, shown at 201, and navigational data 202 presented from a viewpoint located above the actual aircraft. As one of ordinary skill in the art will further understand from reading and comprehending this disclosure, as well as those disclosures cross referenced above, the navigational data presented from a viewpoint located above the actual aircraft is one viewpoint embodiment from which such navigational data can be displayed on MFD 200. The invention is not so limited.

As described above in connection with FIG. 1 and according to the teachings of the present invention, the display format of navigation related, flight information data 202 presented on display 240 is dynamically configurable. In some embodiments, such as shown in the embodiment of FIG. 2A, the NAV display 200 includes softkeys 214 such as shown and illustrated in connection with the PFD of FIG. 1. However, the invention is not so limited. In the embodiment of FIG. 2A, the softkeys 214 can be actuated in order to switch from the top down navigational view illustrated in FIG. 2A to a cockpit perspective view (shown in FIG. 1) or other navigational display perspective, e.g. a birds-eye perspective (a viewpoint from above and behind the actual aircraft). Likewise, in the invention the overlay controls 214, or softkeys, can be used to create or add additional navigation related, flight information data as display insets (e.g. 150 in FIG. 1A) and/or as graphical information overlays (e.g. 160, 170, 180 and 190 in FIG. 1A) on display 240. The invention is not so limited. According to the teachings of the present invention, the primary display region on display 240 and any display insets and/or graphical information overlays are independently or collectively configurable to display navigation related, flight information data. In one embodiment, the primary display region on display 240 provides a two dimensional (2-D) perspective view. However, the invention is not so limited and a three dimensional (3-D) format is considered within the scope of the present invention.

In the embodiment shown in FIG. 2A, the navigational data 202 portion of display 240 illustrates a number of geographical features such as a reservoir 203, a number of roadways 204, a North directional arrow marker 205, a number of aviation waypoints 206, a flight plan waypoint (KUKL) 207, and the aircrafts position relative to these features. However, as one of ordinary skill in the art will understand upon reading this disclosure, the invention is not limited to this particular number or choice of features. And, fewer or more features are included within the scope of the present invention.

In FIG. 2A, MFD 200 is illustrated providing complimentary flight information data to that discussed and illustrated above in connection with the PFD of FIG. 1. That is, as shown in FIG. 2A, engine data is displayed within a vertical column 201 on the display 240 of MFD 200. As one of ordinary skill in the art will appreciate, upon reading the present disclosure, the engine data displayed within a vertical column 201 on MFD 200 does not necessarily have to be displayed within a vertical column (as shown in FIG. 2A) and other presentations of this data, such as within a horizontal region are considered within the scope of the present invention. However, it is recognized that such engine data is flight information data and is desired for presentation in some configuration and/or format to the pilot of an aircraft.

In the embodiment shown in FIG. 2A, the engine data shown in vertical column 201 includes aircraft equipment data, such as fuel flow 203, engine temperature 204, oil temperature 206, oil pressure 208, fuel quantity 210, RPMS 212, electrical system amperage (AMPS) 209. The invention, however, is not limited to this configuration of the aircraft equipment data. In fact, according to the present invention, as described in the above cross referenced application, the actual arrangement of the data displayed in column 201 can be user configurable. Also, as one of ordinary skill in the art will appreciate in reading this disclosure, the engine data 201 which is provided to display 240 is dependent on, or based upon, a given aircraft frame and engine type.

In one embodiment, the engine parameters can be configured for at least three different data displays. As shown in vertical column 201 embodiment of FIG. 2A, data representing the above described, detailed engine parameters are displayed. However, as shown in the embodiment of FIG. 2B, the vertical column 201 can likewise be used to display engine data representing engine power management, shown as exhaust gas temperature (EGT ° C.) and cylinder heat temperature (CHT ° C.) in vertical column 201, in order to regulate fine tuning of the engine power. Alternatively, as shown in the embodiment of FIG. 2C, the vertical column 201 can likewise be used to display engine data representing fuel planning management. That is, as shown in the embodiment of FIG. 2C, vertical column 201 includes such engine data as fuel range, the current fuel burn rate, and or other so related parameters.

According to the teachings of the present invention, the complimentary MFDs, 100 and 200, are used to provide wide graphical data displays integrated in one central location with the controls and devices themselves. In the embodiments shown in FIGS. 1 and 2A, a perspective, cockpit flight view is principally illustrated on the display 140 of PFD 100 in FIG. 1 and a top down view is principally illustrated in on the display 240 of NAV display 200 in FIG. 2A. In the embodiment of FIG. 1, the cockpit flight view on display 140 includes a presentation of flight information data indicators such as airspeed 160, attitude 170, altitude 180, and heading 190. Also, shown overlaid on the display 140 of PFD 100 is a navigational inset 150. In the embodiment of FIG. 2A, the top down view on display 240 includes flight information data relating to the aircraft's engine and shown in vertical column 201. One of ordinary skill in the art will understand upon reading this disclosure that a pilot of an aircraft can user-configure these displays to provide a wide variety and arrangement of different flight information data presentations and navigational perspectives according to the teachings this application, as well as those applications cross referenced above. Again, as one of ordinary skill in the art will understand upon reading this disclosure, in some embodiments the flight information data is dependent on a given aircraft type.

Figure 3:
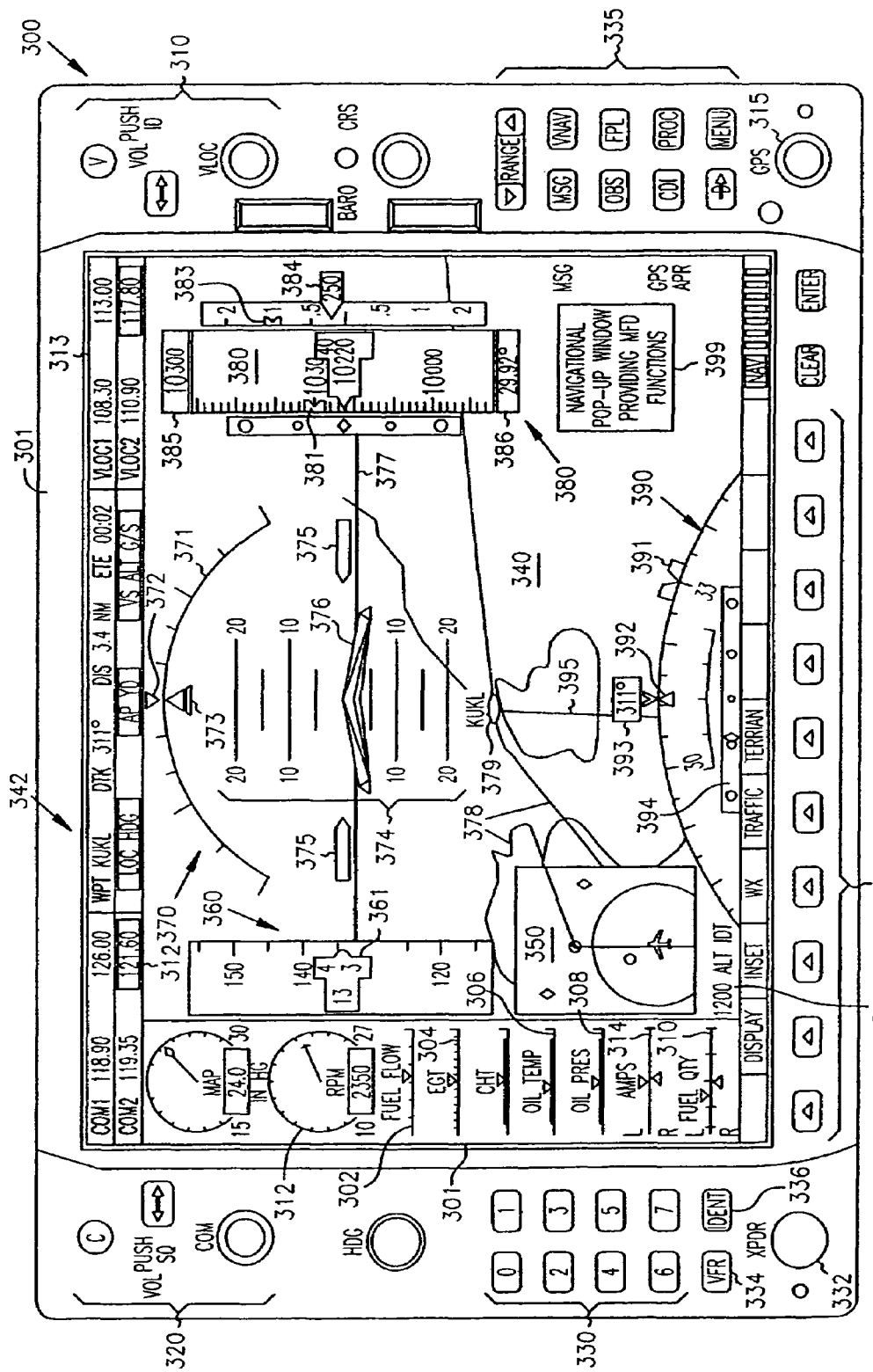
FIG. 3 is an illustration of redundancy capabilities within a multi-functional display, e.g. either the primary or second multi-functional display of FIGS. 1 and 2A–2C, according to the teachings of the present invention.

FIG. 3, illustrates one embodiment of a cockpit instrument panel, including a multifunction display (MFD) 300 according to the teachings of the present invention. The MFD 300 shown in FIG. 3, can be either one of PFD 100 or MFD 200 discussed and described in detail above in connection with FIGS. 1 and 2A–2C. FIG. 3, is intended to illustrate the performance and response of the complementary MFDs 100 and 200 as part of a cockpit instrument system according to the teachings of the present invention. That is, FIG. 3 illustrates an MFD 300, either the PFD 100 or MFD 200, in a reversionary mode providing redundant flight data display. The flight data displayed on MFD 300 can be provided, for instance, when one of the MFDs, e.g. either PFD 100 or MFD 200, fails or alternatively in a test mode. In the invention, and as explained in further detail below, the reversionary mode illustrated on MFD 300 provides a display format which is as similar as possible to the normal flight data display across one or more MFDs.

Figure 4:
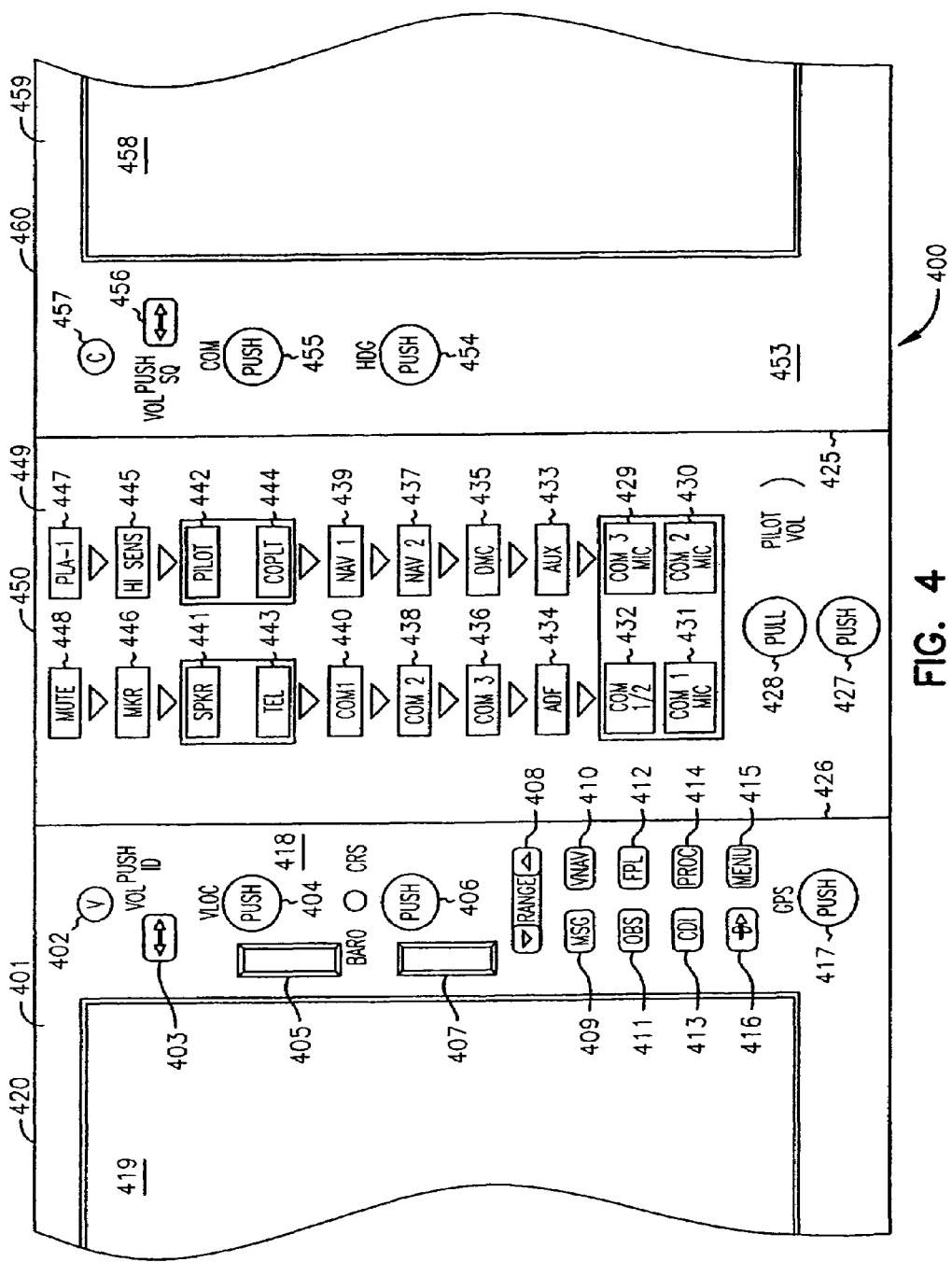
FIG. 4 illustrates an embodiment of a cockpit instrument system, having redundant display capabilities for flight information data, according to the teachings of the present invention.

What is key is that at least one MFD be configured as a PFD such as shown in FIG. 1. As explained above, in some embodiments MFD 200 of FIG. 2A is oriented side by side with the PFD 100 of FIG. 1. In some embodiments, PFD 100 and MFD 200 are oriented side by side with a vertically oriented audio system situated between the two MFDs, 100 and 200 (as shown in FIG. 4). However the invention is not so limited. For example, in some embodiments, PFD 100 and MFD 200 are oriented in a stacked configuration, one above the other. As the reader will comprehend, both MFDs, 100 and 200, are independently configurable to fully display the data which the other MFD displays. That is, the two MFDs can be configured to display identical data, but the elements typically present on a PFD are required.

With one MFD so configured as a PFD, one or more additional MFDs can be used to display different data, e.g. configured primarily as a NAV display (as shown in FIG. 2A). In the example embodiments provided in FIGS. 1 and 2A–2C, FIG. 1 is illustrated with MFD 100 being configured as a PFD and MFD 200 configured as a NAV display.

According to the teachings of the present invention, and as shown in FIG. 3, if either one of the MFDs 100 and 200 in the cockpit instrument system fails, the other MFD which remains functional will present all of the most important flight information data within its display 340. That is, the remaining MFD, shown in reversionary mode as MFD 300 in FIG. 3, will present the important flight information, including airspeed, attitude, altitude, a heading indicator, communication and navigation frequency settings, and the like in a similar format to that shown previously on the PFD 100 of FIG. 1. In FIG. 3, the primary display 340 of the MFD 300 includes the many pieces of flight information data from the PFD. That is, the display includes one or more inset displays, e.g. inset 350, as well as a number of graphical information overlays, e.g. 360, 370, 380 and 390. According to the teachings of the present invention, the display inset 350 and the graphical information overlays, 360, 370, 380 and 390, mirror those illustrated and described in detail above in connection with the PFD 100 of FIG. 1. Display inset 350 provides a navigation view and graphical information overlays, 360, 370, 380 and 390 provide flight information data indicators, which include airspeed 360, attitude 370, altitude 380, and heading 390. In this invention, the display 340 on MFD 300 is additionally referred to as a reversionary screen or reversionary display 340.

According to the teachings of the present invention, the reversionary mode MFD 300 additionally includes engine data 301 within the display 340 which was originally provided on the NAV display 200 of FIG. 2. In the embodiment of FIG. 3, engine data is displayed within a vertical column 301 on the display 340 of MFD 300 in a similar format to that shown previously on the MFD 200 of FIG. 2. However, as discussed previously the engine data displayed within a vertical column 301 on MFD 300 does not necessarily have to be displayed as within a vertical column and other presentations of this data, such as within a horizontal column are considered within the scope of the present invention. However, it is recognized that such engine data is important flight information and it is desirable that the same be presented in similar format to that which was previously provided to the pilot of an aircraft before an MFD failure and hence the format shown in the reversionary mode format of MFD 300 in FIG. 3.

As one of ordinary skill in the art will understand upon reading this disclosure, at least one of the MFDs in a cockpit instrument system will be configured to display a flight plan including procedural legs. According to the teachings of the present invention, the flight plan is provided on the reversionary mode MFD 300 and is shown as a pop-up navigational display 399. Here too, the flight plan 399 will be presented in similar format to that which was previously provided to the pilot of an aircraft before an MFD failure and hence the format shown in the reversionary mode format of MFD 300 in FIG. 3.

As shown in the embodiment of FIG. 3, the engine data shown in vertical column 301 includes aircraft equipment data, such as fuel flow 302, engine temperature 304, oil temperature 306, oil pressure 308, fuel quantity 310, RPMS 312, electrical system amperage (AMPS) 314. In some embodiments, additional flight information data such as outside air temperature, outside air pressure, and the like, are also provided on display 340. The invention is not so limited. In fact, according to the present invention the actual arrangement of the data displayed in column 301 can be user configurable as discussed and described in detail above in connection with FIGS. 2A–2C and as described in the above cross referenced applications which are incorporated herein by reference.

It is further noted that, according to teachings of the present invention, the navigational data which may have been previously displayed in a more expansive view on one of MFDs, 100 or 200, e.g. navigational data from display region 202 in FIGS. 2A–2C, is still presented on the remaining, functional MFD 300 as a navigational inset 350.

As one of ordinary skill in the art will further understand from reading and comprehending this disclosure, as well as those cross referenced above, the navigational data in inset 350, presented from a viewpoint located above the actual aircraft, is one viewpoint embodiment from which such navigational data can be displayed on MFD 300. The invention is not so limited.

In the embodiment of FIG. 3, the navigational data 350 portion of display 340 is still adapted to illustrate a number of geographical features such as a reservoir, a number of roadways, a North directional arrow marker, a number of aviation waypoints, a flight plan waypoint (KUKL), the aircraft's position relative to these features, and the like as discussed and described in detail above in connection with FIGS. 2A–2C.

In one embodiment according to the teachings of the present invention, the remaining functional MFD 300 provides on its display, or reversionary display 340 all of the important flight information data, such as shown in the embodiment of FIG. 3, automatically upon the failure of either PFD 100 (shown in FIG. 1) or NAV display 200 (shown in FIG. 2A), in the cockpit instrument system of the present invention. In an alternative embodiment, the remaining functional MFD 300 displays all of the important flight information data, such as shown in the embodiment of FIG. 3, upon the simple application of a toggle button, or switch, which can be actuated when either PFD 100 (shown in FIG. 1) or NAV display 200 (shown in FIG. 2A), in the cockpit instrument system of the present invention fails. Thus, the pilot is provided with an equivalent PFD in such an event.

According to the teachings of the present invention, such a toggle button or switch can additionally be actuated at any time when it is desired to have all of the flight information data displayed on a single MFD, such as that shown in the reversionary mode MFD 300 embodiment of FIG. 3. For example, a pilot may actuate the toggle button or switch to check the operational status of the present cockpit instrument system in a pre-flight systems check routine. In one embodiment of the present invention, the toggle button or switch is provided on the MFDs themselves. Alternatively in other embodiments, the toggle button or switch is located on a vertical audio instrument panel, positioned between two MFDs horizontally positioned in the cockpit instrument system, as discussed in more detail below in connection with FIG. 4.

Thus, as one of ordinary skill in the art will understand upon reading this disclosure, the remaining functional MFD 300 thus presents all of the important flight information data in order to comply with the FAA's failure probability requirements. Moreover, according to the teachings of the present invention, the flight information data, now presented in full on MFD 300, is presented in substantially the same size and format as it was originally presented between the two MFDs 100 and 200. As one of ordinary skill in the art will appreciate, this is extremely advantageous when a system fails in an aircraft as it does not require any significant mental acclimation to interpret or reference the backup presentation of the flight information data.

Thus, according to the teachings of the present invention, very little mental acclimation is required to readjust to the size, perspective and format of the flight information data on the remaining functional MFD 300. In this manner, the cockpit instrument system of the present invention provides a safer and more user intuitive backup of the flight information data for a pilot and complies with the FAA's redundancy requirements.

FIG. 4 illustrates another embodiment of a cockpit instrument system 400 according to the teachings of the present invention. As shown in FIG. 4, one embodiment of the cockpit instrument system 400 of the present invention includes a first instrument panel 420 having a first bezel 401 with one or more controls (e.g., 402–417) affixed to the first bezel 401. In the embodiment of FIG. 4, the first bezel 401 also surrounds a first display 419 which is operable to present control and equipment data associated with the controls (e.g., 402–417) and other equipment or sensors of the aircraft. The system 400 includes a second instrument panel 460 having a second bezel 459 with one or more additional controls (e.g., 454–457) affixed on the second bezel 459. Moreover, the second bezel 459 surrounds a second display 458 which is operable to present control data and equipment data associated with the additional controls (e.g., 454–457) and other equipment or sensor of an aircraft.

In the embodiment shown in FIG. 4, system 400 includes an audio control panel 450 having an audio bezel 449 with one or more audio controls (e.g., 427–448) affixed on the audio bezel 449. In the embodiment shown in FIG. 4, the audio control panel 450 includes a vertically oriented audio control panel 450 positioned between two side by side MFDs, e.g. 420 and 460. The audio controls (e.g., 427–448) are operable to provide audio capabilities to the pilot. In some embodiments, a first side of 418 of the first bezel 401 which is parallel and proximate to a first side 426 of the audio bezel 449. Further, a second side 425 of the audio bezel 449 is parallel and proximate to a first side 453 of the second bezel 459. As one of ordinary skill in the art will understand upon reading this disclosure, in this system level embodiment of FIG. 4, three independent panels (e.g., 420, 450, and 460) are ergonomically arranged to permit an operator's (e.g., pilot's) fingers on a single hand to simultaneously access one or more controls (e.g., 402–417) of the first bezel 401, one or more controls (e.g., 427–448) of the audio bezel 449, and one or more controls (e.g., 454–457) of the second bezel 459.

As is readily apparent to those skilled in the art, this arrangement of system 400 permits optimal access to controls and displays in a centralized fashion within the cockpit. Correspondingly, a pilot can readily access and obtain information needed during flight without requiring the use of alternate hands or having to focus his/her attention to multiple and sometimes opposite locations within the cockpit.

According to the teachings of the present invention, each of the MFDs, e.g. 420 and 460, in system 400 include the full redundant, or backup, important flight information data display capabilities, as described and discussed in detail above in connection with FIGS. 1–3. In one embodiment, if a given MFD, e.g. 420 or 460, fails, the display, e.g. 419 or 458, of the remaining, functional MFD, 420 or 460, automatically adapts or adjusts to display all of the flight information data, which was previously presented between the two MFDs, in substantially the same size, position, perspective and format. In an alternative embodiment, according to the teachings of the present invention, when one of the MFDs, 420 or 460, fails the remaining, functional MFD, 420 or 460, adapts or adjusts to display all of the flight information data, which was previously presented between the two MFDs, in substantially the same size, position, perspective and format upon the actuation, or application of a toggle button, or switch. In the embodiment shown in FIG. 4, such a toggle button or switch is illustrated as button 427.

Thus, in this manner the cockpit instrument system 400 of the present invention provides a safer and more user intuitive backup of the important flight information data for a pilot. In this manner, the present invention attempts to accord with FAA's failure probability requirements.

In some embodiments of system 400, a separate color is used to represent different information presented on displays 419 and 458. In this way, customized insets within the displays (e.g., 419 or 458) are readily identified as pilot configured information, and information is readily distinguished. Moreover, in some embodiments, messaging controls operable to permit messaging capabilities are located on one or more of the bezels (e.g., 401, 449, or 459).

Figure 5:
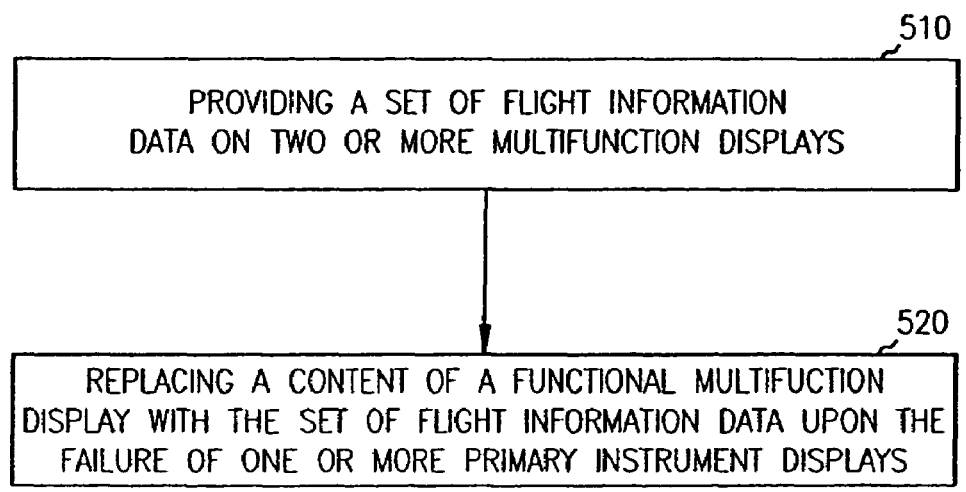
FIG. 5, is a flow diagram of one method embodiment for a redundant presentation of flight information according to the teachings of the present invention.

FIG. 5 illustrates a method for providing redundant flight information data according to the teachings of the present invention. As will be understood by one of ordinary skill in the art upon reading the present disclosure, the methods of the present invention are performed using the devices and systems described above in connection with FIGS. 1–4. As shown in FIG. 5, the method includes providing a set of flight information data on one or more multifunction displays at block 510. The method, according to the teachings of the present invention, further includes replacing a content of a functional multifunction display with the set of flight information data upon the failure of one or more primary instrument displays as shown in block 520, e.g. in a format as described and discussed in detail above in connection with the reversionary mode MFD 300 of FIG. 3.

As one of ordinary skill in the art will understand upon reading this disclosure, the one or more primary instrument displays includes, but is not limited to the one or more multifunction displays from block 510. In one embodiment, providing the set of flight information data on one or more multifunction displays includes providing the set of flight information data between a primary flight display (PFD) and a secondary flight display (NAV display). In one embodiment, providing the set of flight information data on one or more multifunction displays includes providing the set of flight information data on a pair of adjacent multifunction displays.

As explained in detail above, in one embodiment, providing the set of flight information data on one or more multifunction displays includes providing a set of flight information data selected from the group of airspeed, attitude, altitude, and detailed engine parameter data. In one embodiment, providing the set of flight information data on one or more multifunction displays includes providing a set of flight information data which is dependent on an aircraft type.

According to the teachings of the present invention, replacing a content of a functional multifunction display with the set of flight information data upon the failure of one or more primary instrument displays includes presenting the set of flight information data on the multifunction display in a substantially similar size, format, location and perspective as the important flight information data was presented on the one or more MFDs. Thus, the present invention provides a safer and more user intuitive backup of the important flight information data for a pilot in an effort to comply with the FAA's failure probability requirements.

In one embodiment, replacing a content of a functional multifunction display with the set of flight information data upon the failure of one or more primary instrument displays includes presenting the set of important flight information data in a dynamically configurable format. Further, according to one method embodiment of the present invention, replacing a content of a functional multifunction display with the set of important flight information data upon the failure of one or more MFDs includes actuating a button to in order to adjust the content on the remaining MFD.

As one of ordinary skill in the art will understand upon reading this disclosure, the methods of the present invention can be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, cause the processor to perform the respective method. In other embodiments, methods provided above are implemented as a set of instructions contained on a computer-accessible medium capable of directing a processor to perform the respective method. In varying embodiments, the medium includes a magnetic medium, an electronic medium, or an optical medium.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured using C programming language or other high level language and assembly. However, as will be appreciated by one of ordinary skill in the art upon reading this disclosure, the teachings of the present invention are not limited to a particular programming language or environment.

CONCLUSION

The above cockpit instrument panels, systems and methods have been described, by way of example and not by way of limitation, with respect to improving pilot driven controls and pilot delivered information. That is, the instrument panels, systems, and methods provide for better integrated control, access, and presentation of flight information within the cockpit. The integration and placement of controls and displays of the present invention provide for an improved redundant display capability of flight information data on an MFD which includes presenting the flight information data in substantially the same size, position, perspective and format as previously displayed on a failed MFD. In the invention, a system is provided for redundant, proximately situated MFDs which share similar functionality. In this manner, the cockpit instrument system of the present invention provides a safer and more user intuitive backup of the flight information data for a pilot. That is, the pilot is always provided with a PFD which complies with the FAA's probability failure requirements.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A multi-function display (MFD), comprising:
a bezel having controls located thereon which are adapted for controlling communication devices, navigational devices, and equipment sensors; and
a display adjacent to the bezel, to automatically provide a graphical back-up presentation of flight information data upon the failure of one or more primary instrument displays.

2. The MFD of claim 1, wherein the flight information data includes data selected from the group consisting of air speed, attitude, altitude, communication, navigation, and engine data.

3. The MFD of claim 1, wherein the flight information data is dependent on an aircraft frame and engine type.

4. The MFD of claim 1, wherein the display is adapted to provide the backup presentation of the flight information data upon the actuation of a toggle button located on the MFD.

5. The MFD of claim 1, wherein the display is adapted to be dynamically configurable to adjust a content and a configuration of the backup presentation.

6. The MFD of claim 1, wherein the bezel surrounds the display.

7. The MFD of claim 1, wherein the bezel forms a framed perimeter that surrounds the display but is not part of the display.

8. The MFD of claim 1, wherein the controls located on the bezel are selected from the group consisting of a control for a VOR/Localize Receiver, a control for permitting radio communications, a control for a numeric touch pad, a control for a transponder communications mode selector, a control for identifying an aircraft, a control for a VFR Squawk code entry, a control for a GPS receiver, a control for an auto pilot, a control for text messaging, a control for telecommunications, a control for video, and a control for an overlay.

9. The MFD of claim 1, wherein the controls include overlay controls located on a bottom side of the bezel.

10. The MFD of claim 1, wherein the display includes at least one inset display.

11. The MFD of claim 1, wherein the display includes at least one graphical informational overlay.

12. The MFD of claim 1, wherein the display is a reversionary display.

13. The MFD of claim 1, wherein the flight information data is presented in a substantially similar format, size, location and perspective as presented on the one or more primary instrument displays.

14. A multi-function display (MFD), comprising:
- a single display adapted to provide a back-up presentation of a set of flight information data upon the failure of one or more primary instruments displays; and
- a bezel surrounding the display and having controls located thereon which are adapted for control and communication devices, navigational devices, and equipment sensors.

15. The MFD of claim 14, wherein the set of important flight information data includes data selected from the group consisting of air speed, attitude, altitude, communication, navigation, and engine data.

16. The MFD of claim 14, wherein the display is adapted to provide the backup presentation of the set of flight information data upon the actuation of a toggle button located on the MFD.

17. The MFD of claim 14, wherein the display is adapted to be dynamically configurable to adjust a content and a configuration of the backup presentation.

18. The MFD of claim 14, wherein the controls located on the bezel are selected from the group consisting of a control for a VOR/Localize Receiver, a control for permitting radio communications, a control for a numeric touch pad, a control for a transponder communications mode selector, a control for identifying an aircraft, a control for a VFR Squawk code entry, a control for a GPS receiver, a control for an auto pilot, a control for text messaging, a control for telecommunications, a control for video, and a control for an overlay.

19. The MFD of claim 14, wherein the controls include overlay controls located on a bottom side of the bezel.

20. The MFD of claim 14, wherein the display includes at least one inset display.

21. The MFD of claim 14, wherein the display includes at least one graphical informational overlay.

22. The MFD of claim 14, wherein the display is a reversionary display.

23. The MFD of claim 14, wherein the flight information data is presented in a substantially similar format, size, location and perspective as presented on the one or more primary instrument displays.

* * * * *